United States Patent Office

Re. 27,601
Reissued Mar. 20, 1973

27,601

NOVEL WATER-REPELLENT COMPOSITIONS

Jacob M. Fain, Bay Harbor Islands, Fla., and Edward McDonnell, Brooklyn, N.Y., assignors to William L. Alexander, William G. Mulligan, and Foster Dee Snell, trustees for the stockholders of Twenty-Nine West Fifteenth Street Corporation No Drawing. Original No. 3,433,750, dated Mar. 18, 1969, Ser. No. 521,504, Jan. 19, 1966. Application for reissue Dec. 30, 1971, Ser. No. 214,492
Int. Cl. C08g *33/20*
U.S. Cl. 260—2 S 10 Claims

Matter enclosed in heavy brackets [ ] appears in the original patent but forms no part of this reissue specification; matter printed in italics indicates the additions made by reissue.

ABSTRACT OF THE DISCLOSURE

Water repellent compositions comprised of a silico-titanium copolymer and a cationic, surface-active quaternary ammonium compound and to a method of forming transparent water-repellent films on the surface of transparent solids during rain.

The maintenance of clear vision through windshields when they are subjected to rain or a water spray has been a problem for a long time. Visibility is impaired by rain or water spray impinging on the windshields. Mechanical wipers have been used with considerable success on windshields of automobiles, locomotives, boats and planes. However, mechanical wipers are often impractical for today's high speed aircraft, particularly jet aircraft, due to the rapid flow of air over the windshield.

Attempts have been made to render the outer surface of windshields non-wettable by water so the water will break up into tiny droplets which will be blown off by the wind stream passing over the windshield surface. Various coatings and application methods to render the transparent solids non-wettable have been tried. However, the prior art coatings must be applied to a dry windshield. None of these can be used successfully by application under rain conditions.

The more important requirements for such coatings are:

(a) The coatings must be optically clear;

(b) The coatings must adhere strongly to the surface;

(c) The water must be shed from the coating in droplets of a size which will not interfere with vision;

(d) The material must be suitable for application to the cleaned glass of pilots' enclosures and must maintain satisfactory visibility through the glass during varying rain conditions;

(c) The applied material must not produce an objectionable glare under varying conditions of light intensity;

(f) The rain repellant must not have adverse effects on on the materials used in aircraft construction, such as aluminum, aluminum alloys, magnesium alloys, titanium, ferrous alloys, copper alloys, aircraft finishes, glass, etc.;

(g) In view of the fact that the material is spread in thin films, the rain repellant is required to have suitable characteristics both in volume and when spread in thin films;

(h) The material must not be excessively high in cost;

(i) The material should have as high a flash point as possible prior to application;

(j) The material must be low in toxicity and it should not constitute a medical hazard to personnel or produce obnoxious vapors;

(k) The material must have good storage stability in the container; it should not deteriorate in the container under normal storage conditions in the temperature range of −40° F. to 160° F. and be usable at temperatures of −20° F. to 110° F.;

(l) The material after application must not pick up excessive dust or lightweight particles;

(m) The material must be capable of being applied to the glass easily;

(n) The material shall be capable of being applied in flight under rain conditions.

Many different type films have been tried by the prior art and the most successful prior to applicants' invention have been various films containing organic silicon compounds. However, all of the prior art films have failed in one or more of the essential requirements listed above.

Silicone and silicone-wax combinations have been used as aircraft rain repellants. U.S. Patent No. 2,612,458 (Stedman) discloses rain repellents consisting of substituted polysilicanes having at least one Si—Si linkage and containing only carbon, hydrogen and silicon. They cannot be effectively applied during rain.

U.S. Patent No. 2,923,633 (Stedman) describes an improved composiiton which is achieved by substituting alkoxy groups for some of the alkyl groups in the poly silicane. These alkoxy groups being somewhat reactive are caused to condense when rubbed on the glass surface. This makes it possible to provide a repellent surface with these films alone and unnecessary to apply a wax overcoating. However, the coating must be applied to a dry windshield. It cannot be effectively applied during rain.

U.S. Patent No. 2,962,390 (Fain et al.) describes a silane-wax system. This discloses a paste containing a solid rubbing agent and an alkyl alkoxy silane, such as amyl triethoxysilane. When the paste is rubbed on a glass surface, some hydrolysis and condensation of the silane occurs and a film of amyl polysiloxane is deposited on the glass. This forms a suitable surface on which a more repellent wax film may be deposited. This system has been found to have relatively great ease of application. It must, however, be applied to a dry windshield. It cannot be effectively applied in flight or during rain.

It is also known that exposure of various materials to vapors of di- and tri-functional methylchlorosilanes results in the deposition of a stable water-repellent layer on the surface. The water-repellent treatment consists of rapidly reacting methylchlorosilane vapors with surface hydroxyl groups or water adsorbed on the surface of the material to be coated and in this manner depositing a thin film of methylpolysiloxane on the surface. The reaction is found to occur with cotton cloth, paper, wood, and in a less pronounced way, with wool, silk, leather and many other materials.

Methylchlorosilane vapors also react readily with glass and other ceramic surfaces to give very effective water-repellent films, but only if the surface has an absorbed film of water on it. Completely dry glass, baked under vacuum, does not become distinctly water-repellent upon treatment. Glass which has stood at atmospheric conditions usually has on its surface a film of water up to 100 molecules thick, the actual thickness depending on the relative humidity of the surrounding air. The experimental facts indicate a rapid hydrolytic reaction of the methylchlorosilane vapors at the surface of the object being treated. Insofar as the end result is concerned, it does not matter whether the reaction is one with adsorbed water or with hydroxyl groups in a structure like that of cellulose which are capable of reacting. The important point is that the polysiloxane film appears to be chemically bonded to the substrate probably through oxygen, and it can be renoved only by strong chemical action or severe abrasion.

The application of methylchlorosilane vapor to aircraft windshields renders them water-repellent so that the high speed air stream easily removes rain and promotes good vision. A method has been developed for applying methylchlorosilane vapors to aircraft windshields. The film exhibits excellent rain repellency, abrasion and heat resistance. The serious disadvantages are that the material is toxic and corrosive in bulk and requires an elaborate and time-consuming application procedure. The windshield is covered with a vapor-tight protective hood; an open container of methylchlorosilane is place in the hood, and the vapors are allowed to condense on the clean windshield for 30 to 60 minutes. The entire operation including set up, clean up, etc. requires up to two hours to complete. These disadvantages prohibit the use of the vapor treatment as a regular field or flight line operation or during flight.

Commonly assigned, copending U.S. application Ser. No. 310,122, filed Sept. 19, 1963, now abandoned, discloses the use of certain silico-titanium copolymers for forming water-repellent transparent films on surfaces of transparent solids which are optically clear and which can be applied to wet surfaces. However, when these polymers are applied to wet surfaces during flight, it has been found that the said polymers form a foaming or heavy deposit of the polymer on portions of the treated surface due to excess polymer which is not washed off by the rain. This poor spreading characteristic restricts the use of these polymers for in-flight application during rain.

OBJECTS OF THE INVENTION

It is an object of the invention to provide novel improved water-repellant compositions comprised of a silico-titanium copolymer and a cationic, surface-active quaternary ammonium compound.

It is another object of the invention to provide a novel improved process of making the surface of transparent solids water-repellent.

It is an additional object of the invention to provide transparent solids having water-repellent surfaces.

These and other objects and advantages of the invention will become obvious from the following detailed description.

THE INVENTION

The novel compositions of the invention are comprised of a cationic, surface-active quaternary ammonium compound and a silico-titanium copolymer formed by reacting the hydrolysis product of a silane selected from the group consisting of dialiphatic dialkoxy silane having the formula:

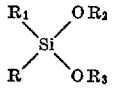

a dialiphatic dihalo silane having the formula:

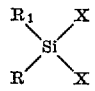

and a monoaliphatic trihalo silane having the formula:

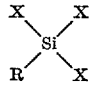

wherein R and $R_1$ are selected from the group consisting of alkenyl and alkyl radicals having 1 to 18 carbon atoms, $R_2$ and $R_3$ are alkyl radicals having 1 to 7 carbon atoms and X is a halogen with a tetraalkyl titanium salt of aliphatic alcohols having 1 to 10 carbon atoms and 1 to 2 hydroxyl groups, the volume ratio of said cationic compound to said copolymer being 0.005 to 0.5, preferably 0.01 to 0.1.

Examples of suitable dialiphatic dialkoxy silanes are dimethyl diethoxy silane, diethyl diethoxy silane, dimethyl dimethoxy silane, diethyl dimethoxy silane, dibutyl dimethoxy silane, dibutyl diethoxy silane, dibutyl dibutoxy silane, and methyl vinyl diethoxy silane. Examples of suitable monoaliphatic trihalo silanes and dialiphatic dihalo silanes are monoethyl trichloro silane, monomethyl trichloro silane, dimethyl dichloro silane, diethyl dichloro silane, dipropyl dibromo silane, dibutyl diiodo silane, etc. Examples of suitable tetraalkyl titanates are tetraisopropyl titanate, tetrabutyl titanate, partially polymerized tetrabutyl titanate, tetra-2-ethylhexyl titanate, tetraoctylene glycol titanate, etc.

Examples of suiable cationic, surface-active quaternary ammonium compounds for the compositions of the invention are aliphatic trimethyl ammonium halides wherein the aliphatic radical has 8 to 22 carbon atoms such as Arquad 12–50 (essentially dodecyl trimethyl ammonium chloride), Arquad 16–20 (essentially hexadecyl trimethyl ammonium chloride), Arquad 18–50 (essentially octadecyl trimethyl ammonium chloride), etc.; dialiphatic dimethyl ammonium halides wherein the alphatic radicals have 8 to 22 carbon atoms such as Arquad 2C–75 (dicoco dimethyl ammonium chloride in which the alkyl groups are essentially dodecyl), Arquad 2HT–75 (essentially dioctadecyl dimethyl ammonium chloride), etc.; mixtures of aliphatic trimethyl and dialiphatic dimethyl ammonium halides such as Arquad T–2C and S–2C in which the aliphatic groups are octyl, decyl, dodecyl, tetradecyl, hexadecyl, octadecyl, octadecenyl and octadecadienyl, etc.; quaternized heterocyclic tertiary amines having an aliphatic radical of 8 to 22 carbon atoms such as cetyl pyridinium chloride, etc.; aliphatic aryl dimethyl ammonium halides wherein the aliphatic radical has 8 to 22 carbon atoms, such as Triton X–400 (stearyl dimethylbenzyl ammonium chloride), etc.; aliphatic alkoxy aryl ammonium halides such as Triton 10–X (diisobutylcresoxyethoxyethyl dimethylbenzyl ammonium chloride), Hyamine 1622 (diisobutylphenoxyethoxyethyl dimethylbenzyl ammonium chloride), etc. Examples of additional cationic surface-active quaternary ammonium salts are disclosed in "Surface-Active Agents and Detergents," vol. II, Schwartz et al., 1958, pp. 112 to 118.

The addition of the cationic surface-active quaternary ammonium salts to the silico-titanium copolymers improves the spread of the copolymer over the wet surface to be coated and eliminates heavy deposits of the copolymer. Anionic and non-ionic surface-active agents are not useful in the invention since they reduce the film-forming ability of the copolymer when applied to wet surfaces, and when applied to dry surfaces, the resulting film fails due to stripping because of the presence of the water-sensitive surfactants in the film. High molecular weight amines and alkoxylated derivatives thereof are cationic surface-active agents but are unsatisfactory for the invention probably because they only ionize in water under acidic conditions which conditions cause decomposition of the acid-sensitive copolymer.

The following theory is believed to explain how the cationic surface-active agents effect the advantages obtained by their use with the copolymer but it is to be understood that the invention is not intended to be limited to any such theory.

Cationic agent ionize in the presence of water to yield high molecular weight, positively charged cations. These cations are oriented at the silico-titanium copolymer-water interfaces whereby the cationic portion is dissolved in the copolymer with the positively charged polar groups facing away from the copolymer phase. The polar groups are strongly attracted to any negatively charged surface and will become firmly attached thereto. Since most surfaces in contact with water carry a negative charge, the copolymer phase of the emulsion or suspension is readily exhausted onto the wet transparent surface and the attachment thereof is so strong that the water on the surface is displaced and replaced by cationically treated silico-titanium copolymer. The cation is so firmly bonded to the transparent surface that it no longer acts as emulsifier and will not cause stripping of the water-repellent film when exposed to water as in the case of anionic and non-ionic surface-active agents. The quaternary ammonium surface-active agents are useful since they will ionize at any pH levels.

The novel compositions of the invention when applied to wet transparent surfaces, such as glass and acrylic plastics, form a durable water-repellent film which fulfills, all the requirements listed above. In addition, the said compositions have the novel feature of being capable of being evenly applied without foaming or heavy deposits during flight in rain which has not been possible with the prior art compositions.

The hydrolysis of dialiphatic dialkoxy silanes can be easily effected by strong mineral or organic acids, such as hydrochloric acid, sulfuric acid, p-toluene sulfonic acid, etc. The hydrolysis product is then reacted with the tetraalkyl titanate by refluxing at temperatures from 100 to 200° C. to form the said silico-titanium copolymer. The formation of the silico-titanium copolymer from the monoaliphatic trihalo silanes and the dialiphatic dihalo silanes is disclosed in U.S. Pat. No. 2,512,058 and comprises hydrolyzing the said aliphatic halo silanes with water and reacting the hydrolysis product with the tetraalkyl titanate at a temperautre of 100 to 300° C. to form the silico-titanium copolymer.

The rain-repellent compositions of the invention can be applied to transparent surfaces in any convenient fashion. One advantage of the compositions of the invention is that the transparent surfaces do not have to be dry before applying the composition as is necessary for the known water-repellent compositions. The water-repellent films can be formed by wiping the transparent surface to be coated with the composition, by spraying the composition per se or in solution in an organic solvent such as hydrocarbons with a spray gun or atomizer, or by spraying from an aerosol container since the composition is miscible with fluorinated hydrocarbon propellants. Examples of suitable organic solvents are hydrocarbons such as hexane, toluene, mineral spirits, naphtha, etc. and halogenated hydrocarbons such as trifluorotrichlorethane and may contain up to 10% of an anhydrous lower alkanol such as methanol, ethanol, propanol, butanol, etc.

In the following examples there are described several preferred embodiments to illustrate the invention. However, it should be understood that the invention is not intended to be limited to the specific embodiments.

EXAMPLE I

To 100 cc. of dimethyl diethoxy silane, 0.25 cc. of concentrated sulfuric acid was added to acidify the said silane and then 50 cc. of water were slowly added with stirring. Aqueous and oil phases were formed. After addition of the water, 25 cc. of a 4% solution of sodium carbonate in water were added to neutralize the acid catalyst. Hexane was added to form a solution with the hydrolysis product. The hexane solution of the hydrolysis product was separated from the aqueous phase, heated to 100 to 105° C., and hexane and the ethyl alcohol formed by the hydrolysis and any water present were removed by distillation, leaving the hydrolysis product as a liquid residue.

The hydrolysis product formed by this procedure was then mixed with 50% by volume of tetrabutyl titanate and the resulting mixture was refluxed at 100 to 105° C. for two hours to form the desired silico-titanium copolymer. Five parts by volume of the resulting copolymer and 0.5 part by volume of Arquad 2C–75 were dissolved in 94.5 parts by volume of trichlorotrifluoroethane.

A laboratory test apparatus, in which a glass test panel is tilted at an angle of 40° to wind and water spray so that the water is blown across the panel, was used to determine the effectiveness of the above water-repellent composition. The said composition was sprayed onto the wet glass panel and formed an optically clear, water-repellent film and the excess of the composition was quickly washed off the panel without forming heavy or foaming deposits thereon as was the case when the same copolymer in solution without the cationic surface-active agent was tested.

EXAMPLE II

Fifty parts by volume of the silico-titanium copolymer described in Examples I, 0.5 part by weight of Hyamine 1622 and 2.5 parts by volume of ethanol were dissolved in 47.0 parts by volume of mineral spirits. The said composition was sprayed onto the wet test panel as described in Example I and formed an optically clear, water-repellent film. The excess of the composition was quickly washed off the panel without forming heavy or foaming deposits thereon as was the case when the same copolymer in solution without the cationic surface-active agent was tested.

EXAMPLE III

Fifty parts by volume of the silico-titanium copolymer described in Example I, 0.5 part by weight of cetyl pyridinium chloride and 2.5 parts by volume of ethanol were dissolved in 47.0 parts by volume of mineral spirits. The said composition was sprayed onto the wet test panel as described in Example I and formed an optically clear, water-repellent film. The excess of the composition was quickly washed off the panel without forming heavy or foaming deposits thereon as was the case when the same copolymer in solution without the cationic surface-active agent was tested.

EXAMPLE IV

Fifty parts by volume of the silio-titanium copolymer described in Example I, 0.5 part by volume of Arquad 18–50 and 2.5 parts by volume of ethanol were dissolved in 47.0 parts of trifluorotrichloroethane. The said composition was sprayed onto the wet test panel as described in Example I and formed an optically clear, water repellent film. The excess of the composition was quickly washed off without forming heavy or foaming deposits thereon as was the case when the same copolymer in solution without the cationic surface-active agent was tested.

EXAMPLE V

Fifty parts by volume of the silico-titanium copolymer described in Example I, 0.5 part by volume of Arquad 12–50 and 2.5 parts by volume of ethanol were dissolved in 47.0 parts by volume of trifluorotrichloroethane. The said composition was sprayed onto the wet test panel as described in Example I and formed an optically clear, water-repellent film. The excess of the composition was quickly washed off without forming heavy or foaming deposits thereon as was the case when the same copolymer in solution without the cationic surface-active agent was tested.

EXAMPLE VI

To 50 parts by volume of the hydrolysis product described in Example I were added 65 parts by volume of tetraoctyleneglycol titanate and the resulting mixture was refluxed at 110° to 115° C. for 2 hours to form the desired silico-titanium copolymer. Fifty parts by volume of the resulting copolymer and 0.5 part by volume of Arquad 2C–75 were dissolved in 49.5 parts by volume of mineral spirits. The said composition was sprayed onto the wet test panel as described in Example I and formed an optically clear, water-repellent film. The excess of the composition was quickly washed off the panel without forming an oil deposit thereon as was the case when the same copolymer in solution without the cationic surface-active agent was tested.

EXAMPLE VII

To 120 parts by volume of the hydrolysis product described in Example I were added 100 parts by volume of tetra-2 ethylhexyl titanate and the mixture was refluxed at 165° to 170° C. for 2 hours to form the desired copolymer. Fifty parts of the resulting copolymer and 0.5 part by volume of Arquad 2C–75 were dissolved in 49.5 parts by volume of mineral spirits. The said composition was sprayed onto the wet test panel as described in Example I and formed an optically clear, water-repellent film. The excess of the composition was quickly washed off the panel without forming heavy or foaming deposits thereon as was the case when the same copolymer in solution without the cationic surface-active agent was tested.

EXAMPLE VIII

Twenty-five parts by weight of methyltrichlorosilane and seventy-five parts by weight of dimethyldichlorosilane were mixed in ether solution and added to cracked ice representing water in excess of the amount required for the hydrolysis of the said silanes. An ether layer containing the hydrolysis product separated from the excess water containing liberated hydrogen chloride and was removed. The ether solution was dried over anhydrous sodium sulfate and the ether was removed by distillation. To 40 parts by volume of the hydrolysis product were added 17.2 parts by volume of tetrabutyl titanate and the mixture was refluxed at 200° C. for 8 hours and then heated for 8 hours in the open at 200° C. to form the desired copolymer. Five parts by volume of the resulting copolymer and 0.5 part by volume of Arquad 2C–75 were dissolved in 94.5 parts by volume of mineral spirits. The said composition was sprayed onto the wet test panel as described in Example I and formed an optically clear, water-repellent film. The excess of the composition was quickly washed off the panel without forming heavy or foaming deposits thereon as was the case when the same copolymer in solution without the cationic surface-active agent was tested.

Various modifications of the process and compositions of the invention may be made without departing from the spirit or scope thereof and it is to be understood that the invention is to be limited only as defined in the appended claims.

We claim:

1. A composition for forming optically clear, water-repellent films on surfaces of transparent solids consisting essentially of a solution without any water present therein of a silico-titanium copolymer formed by reacting at a temperature of 100 to 300° C. the hydrolysis product of a silane selected from the group consisting of dialiphatic dialkoxy silanes of the formula

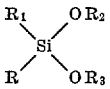

a dialiphatic dihalo silane of the formula

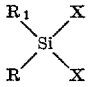

and a monoaliphatic trihalo silane of the formula

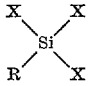

wherein R and $R_1$ are selected from the group consisting of alkenyl and alkyl of 1 to 18 carbon atoms, $R_2$ and $R_3$ are alkyl of 1 to 7 carbon atoms and X is a halogen with a tetraalkyl titanium salt of aliphatic alcohols of 1 to 10 carbon atoms and having 1 to 2 hydroxy groups and a cationic surface-active quaternary ammonium compound, selected from the group consisting of aliphatic trimethyl ammonium halides [and dialiphatic dimethyl ammonium halides and mixtures thereof] having 8 to 22 carbon atoms in the aliphatic groups, quaternized heterocyclic tertiary amines having an aliphatic radical of 8 to 22 carbon atoms, aliphatic aryl dimethyammonium halides having 8 to 22 carbon atoms in the aliphatic group and aliphatic alkoxyaryl ammonium halides in an organic solvent, the volume ratio of cationic compound to said copolymer being 0.005 to 0.5.

2. A composition of claim 1 wherein the quaternary ammonium compound is an aliphatic trimethylammonium halide wherein the aliphatic radical has 8 to 22 carbon atoms.

[3. A composition of claim 1 wherein the quaternary ammonium compound is a dialiphatic dimethyl ammonium halide wherein the aliphatic radicals have 8 to 22 carbon atoms.]

4. A composition of claim 1 wherein the quaternary ammonium compound is a quaternized heterocyclic tertiary amine having an aliphatic radical of 8 to 22 carbon atoms.

5. A composition of claim 1 wherein the tetraalkyl titanate is tetrabutyl titanate.

6. A composition of claim 1 wherein the silane is dimethyl diethoxy silane.

7. A method of forming an optically clear, water-repellent film on the surface of a transparent object, which comprises applying to the surface of a transparent object a thin film of a composition of claim 1 and removing any excess of the said composition.

8. The method of claim 7 wherein the quaternary ammonium compound is a dialiphatic dimethyl ammonium halide wherein the aliphatic radical has 8 to 22 carbon atoms.

[9. The method of claim 7 wherein the quaternary ammonium compound is a dialiphatic dimethyl ammonium halide wherein the aliphatic radicals have 8 to 22 carbon atoms.]

10. The method of claim 7 wherein the quaternary ammonium compound is a quaternized heterocyclic tertiary amine having an aliphatic radical of 8 to 22 carbon atoms.

11. The method of claim 7 wherein the tetraalkyl titanate is tetrabutyl titanate.

12. The method of claim 7 wherein the silane is dimethyl diethoxy silane.

References Cited

The following references, cited by the Examiner, are of record in the patented file of this patent or the original patent.

UNITED STATES PATENTS

| | | | |
|---|---|---|---|
| 3,639,131 | 2/1972 | Clarke | 106—2 |
| 3,442,664 | 5/1969 | Heine | 117—124 F |
| 2,512,058 | 6/1950 | Gulledge. | |
| 2,721,812 | 10/1955 | Iler. | |
| 2,732,320 | 1/1956 | Guillissen et al. | |
| 3,262,830 | 7/1966 | Vincent. | |
| 3,291,634 | 12/1966 | Wada et al. | |
| 3,308,080 | 3/1967 | Haenni. | |
| 3,310,429 | 3/1967 | Gunnar et al. | 106—13 |
| 3,352,709 | 11/1967 | Gunnar et al. | 106—13 |

DONALD E. CZAJA, Primary Examiner

C. W. IVY, Assistant Examiner

U.S. Cl. X.R.

106—2, 13; 117—124 F, 124 D, 161 ZA; 260—46.5 E, 46.5 G